H. M. Conklin,
Bed Bottom,
Nº 69,632. Patented Oct. 8, 1867.

Witnesses:

Inventor:
H. M. Conklin

United States Patent Office.

HARRY M. CONKLIN, OF SYRACUSE, NEW YORK.

Letters Patent No. 69,632, dated October 8, 1867; antedated October 2, 1867.

---

IMPROVED BED-BOTTOM.

---

*The Schedule referred to in these Letters Patent and making part of the same.*

---

TO ALL WHOM IT MAY CONCERN:

Be it known that I, HARRY M. CONKLIN, of Syracuse, in the county of Onondaga, in the State of New York, have invented certain new useful improvements in Spring-Beds; and I declare the following to be a true and full description thereof, reference being had to the accompanying drawings illustrative thereof.

Figure 1:
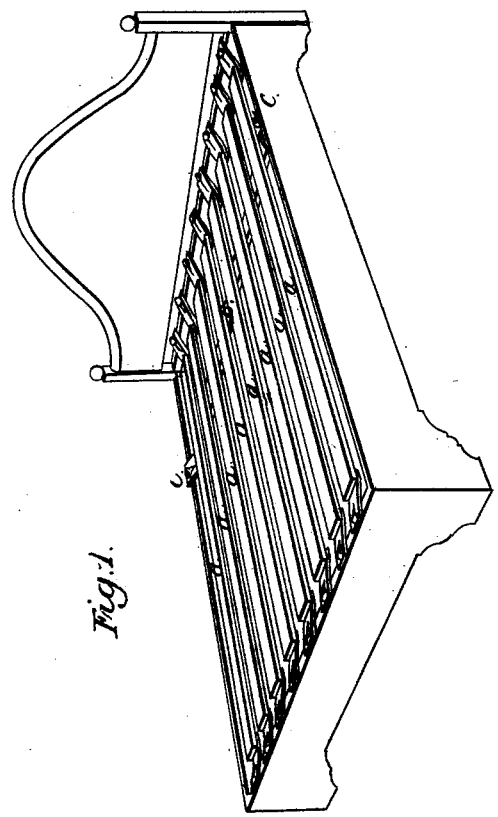
Figure 2:
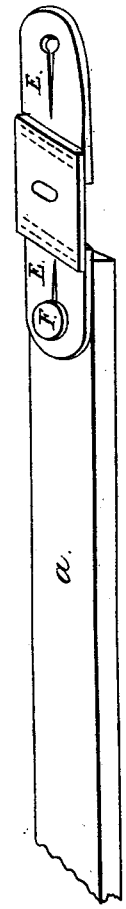

My improved spring-bed is of that class intended to support a mattress, and is composed of wooden slats, shown at $a$ $a$ $a$, &c., Figure 1. These slats are attached by elastic webbing, as shown at D in fig. 2, which is a view of one of the slats detached and inverted to show how the elastic webbing is buttoned directly on to the bedstead, and therefore this arrangement requires no other framework, and is much cheaper, and less liable to get out of order.

But one of the principal elements of my improvement consists in the employment of an elastic equalizing-bar, B, across under the said slats, with its ends attached to the side rails of the bedstead by elastic-webbing attachments buttoned to the side rails, as shown at $c$ $c$. The principal object of this equalizing-bar is to support the slats directly under the heavier part of the body, and thereby prevent the unpleasant permanent sagging so common to spring-beds.

This arrangement also adds very much to the strength of all the parts, and so steadies and supports the longitudinal slats that they remain in proper position, and operate much more pleasantly for the occupant of the bed.

Having thus fully described my improved spring-bed, what I claim therein as new, and desire to secure by Letters Patent, is—

The combination of the bed-rails $a$ $a$, the traversing-bar B, and the fastenings composed of the webbing D, slat-protections E E, and the buttons F F, all substantially in the manner described and arranged as and for the purposes set forth.

H. M. CONKLIN.

Witnesses:
M. T. HUBBARD,
J. PRUYN.